Feb. 11, 1958 J. W. GRAY 2,822,977

COMPUTER FOR DIVIDING

Filed Feb. 9, 1953 2 Sheets-Sheet 1

Inventor
JOHN W. GRAY

By

H. L. Mackey
Attorney

Feb. 11, 1958 J. W. GRAY 2,822,977

COMPUTER FOR DIVIDING

Filed Feb. 9, 1953 2 Sheets-Sheet 2

INVENTOR.
JOHN W. GRAY

BY H. L. Mackey

ATTORNEY

United States Patent Office 2,822,977

Patented Feb. 11, 1958

2,822,977

COMPUTER FOR DIVIDING

John W. Gray, Chappaqua, N. Y., assignor to General Precision Laboratory Incorporated, a corporation of New York Application February 9, 1953, Serial No. 335,809

12 Claims. (Cl. 235—61)

This invention relates to computers for the solution of mathematical functions, and more particularly to analogue computers for determining the quotient of any two numerical values.

More specifically the invention provides an electrical computer wherein the numerical values to be operated upon are represented by electrical quantities constituting input data. The resultant quotient likewise is represented by an electrical quantity constituting output data which may be utilized to operate a suitable indicator, a common example of which might be a rotatable shaft or other element; the rotation of the shaft or other element being utilizable to control some special function or to merely indicate a quantity.

Electrical computers of the general type to which this invention relates have heretofore been proposed and the present invention constitutes an improvement in such computers permitting the derivation of quotients having any value between plus and minus infinity.

Accordingly, the primary object of the present invention is to provide an improved computer for dividing one number by another.

Another object is to provide an improved computer for automatically and continuously dividing one variable number by another variable or constant number and continuously deriving the quotient in a form which is readily utilizable.

A further object is to provide improved means for dividing electrical quantities, the magnitudes of which represent input data, to derive a quotient in the form of another electrical quantity representing the quotient in a form which may be utilizable as an indication or as a control quantity.

Figures 1, 3:
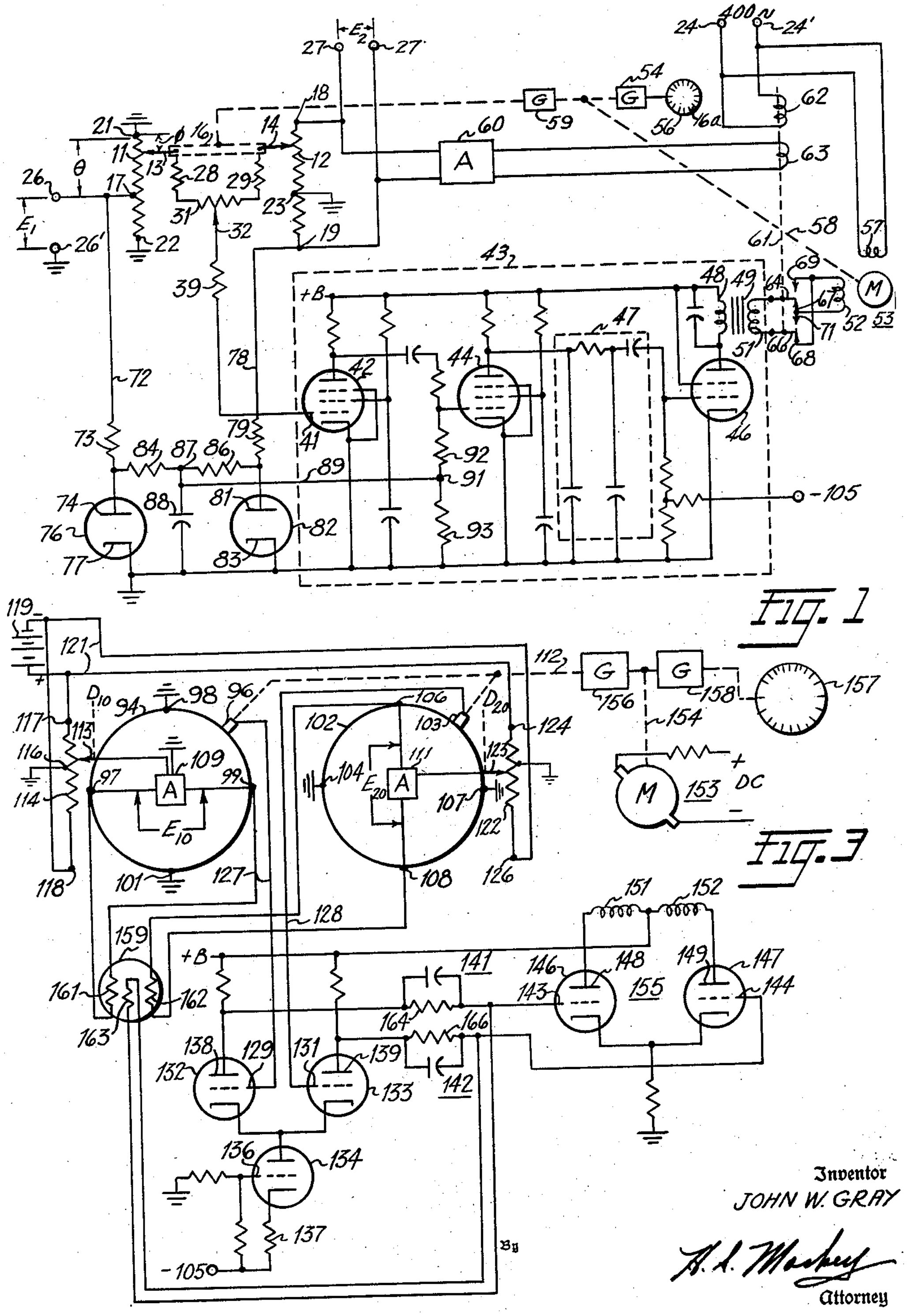

Other and further objects will be readily apparent from the following description when considered in connection with the accompanying drawings, in which:

Figure 1 schematically illustrates one form of the invention.

Figure 2:
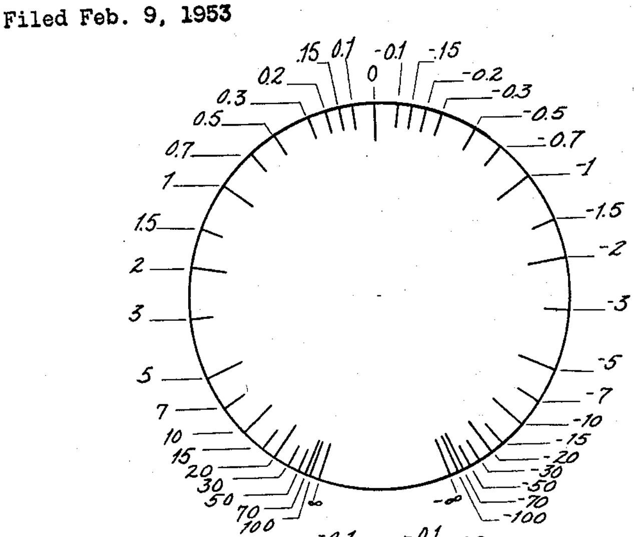

Figure 2 depicts the output scale employed with the circuit of Fig. 1.

Figure 3 schematically illustrates another form of the invention.

Figure 4:
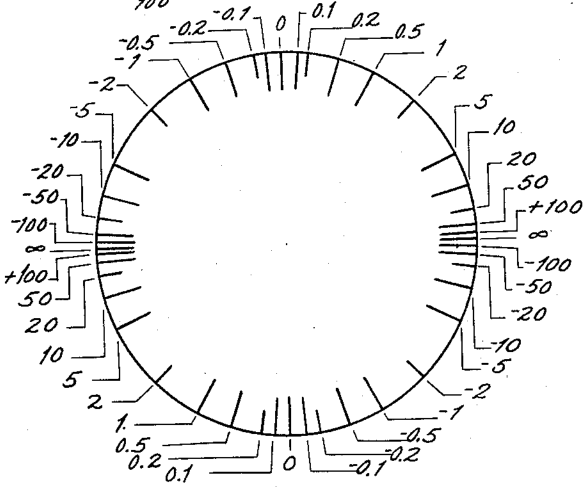
Figure 5:
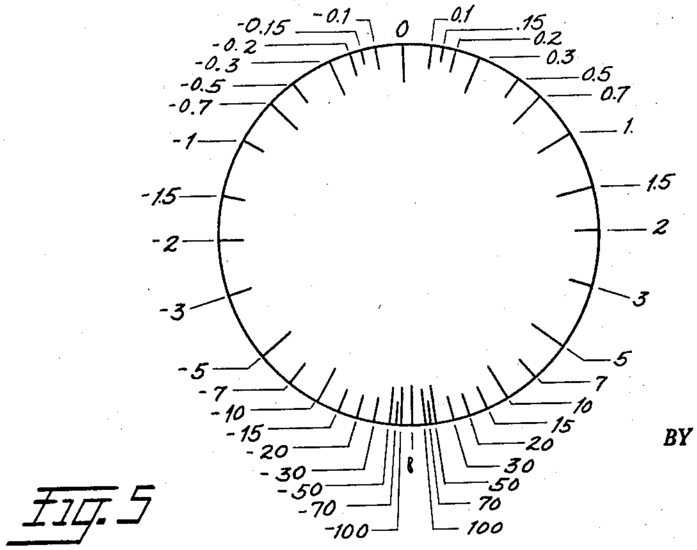

Figures 4 and 5 depict output scales which can be employed with the circuit of Fig. 3.

The input data for the present computer may be in the form of mechanical movements or electrical quantities, but if the data is in the form of mechanical movements, it must be converted to electrical quantities. Furthermore, the data supplied to the individual inputs should preferably be in the same terms, such as both being direct current, alternating current or pulsed current. In the case of alternating current or pulsed current, there must be a common reference base or known phase between the instantaneous values of the two inputs.

The present invention contemplates the use of voltage dividers utilizing the principles of Ohm's law. Although the invention is illustrated by the use of resistance voltage dividers, which are useful with either direct or alternating current, variable impedance voltage dividers may be used instead when the input data is in the form of alternating or pulse current.

Broadly speaking, the invention contemplates two voltage dividers, one for each input, and means for applying across each voltage divider a voltage proportional, respectively, to each of the two input data quantities. The apparatus is so constructed that a certain displacement of each slider away from a selected reference point necessary to select points of instantaneous equal and opposite potential on the two potential dividers constitutes a measure of the ratio of the input quantities. Preferably, a servomechanism is provided which is responsive to the instantaneous potential difference or "error signal" potential between points on the two potential dividers to adjust to the null position, the movement of the servomechanism constituting a measure of the ratio or quotient of the two input quantities. The servomechanism may additionally be provided with stabilizing circuits in such manner that the inputs, in proportion to their magnitudes, act to offset variations in servo loop sensitivity.

The system is capable of dividing one selected value by another selected value, but can be used also to indicate continuously the quotient of two input data, one or both of which may be varying. Its action is automatic and its versatility is limited only by the inertia of the mechanical parts and the damping of the stabilizing circuits.

An embodiment of the invention is shown in Fig. 1. It utilizes two center-tapped linear voltage dividers 11 and 12 as the basic computing mechanism, with their sliders 13 and 14 connected mechanically by a rigid insulating link indicated by the dashed rectangle 16. Electrical potentials are introduced to the midterminal 17 of the voltage divider 11 and to the end terminals 18 and 19 of the voltage divider 12, the end terminals 21 and 22 of divider 11 and the midterminal 23 of divider 12 being grounded. This arrangement permits employment of ordinary circular voltage dividers back-to-back, with sliders mechanically on the same shaft but electrically insulated from each other. Thus, when slider 13 is at end terminal 21, slider 14 is at end terminal 18.

Although linear voltage dividers are specified and are most useful, non-linear types may be employed instead to give the output dial scale a desired form.

The term "ground" is intended to denote a common return connection only, and not necessarily a connection to the earth, this grounded type of connection being employed to improve the clarity of the drawings.

The two input data may be of any character which can be represented by voltage magnitudes, or the input data may themselves be voltage magnitudes. The data as presented to the computer are preferably in voltage form, as indicated in Fig. 1 by $E_1$, which is the dividend, and $E_2$, which is the divisor. Alternatively they may be in current form with appropriate changes of dividers 11 and 12. Each input datum voltage may have any assigned value of magnitude from a positive value to a negative value, including zero. The input voltages may both be direct, alternating, or pulsed. However, if alternating or pulsed, their phases must be known relative to a reference source and preferably the phases at, for example, terminals 17 and 18 are either in agreement or exactly opposed.

The voltage source employed in Fig. 1 is an alternating voltage having a frequency of 400 C. P. S., and its terminals are indicated at 24 and 24'. The input data $E_1$ and $E_2$ are derived from this source and are applied at terminals 26—26' and 27—27' respectively. These data have such polarities or senses that when $E_1$ and $E_2$ represent positive data values and the instantaneous potential at terminal 24 is positive, that of $E_1$ at 17 is also positive and that of $E_2$ at 18 is negative, with 19 positive. It follows that if $E_1$ should represent negative data values the instantaneous voltage at 17 would be negative, or if $E_2$ should represent negative values the instantaneous voltage at 18 would be positive, with 19 negative.

The computer performs the mathematical operation $$Z=\frac{E_1}{E_2} \qquad (1)$$

in which Z is the quotient.

The relation of each potential to the datum represented by it is expressed by $$D_1=C_1E_1 \text{ and } D_2=C_2E_2 \qquad (2)$$

$D_1$ and $D_2$ being the input data and $C_1$ and $C_2$ being scale constants. Therefore $$Y=\frac{D_1}{D_2}=\frac{C_1E_1}{C_2E_2}=C\frac{E_1}{E_2}=CZ \qquad (3)$$

showing that the desired quotient Y bears a constant relation C to the electrical quotient Z.

A preferred method of indicating equality of slider voltages of opposite sense or polarity is shown in Fig. 1. The two sliders are connected by a resistance network consisting of resistors 28 and 29 connected by a voltage divider 31 with slider 32 leading to a sensitive voltage and phase detecting device. When alternating voltages are employed, with the phase senses instantaneously opposed in the upper halves of dividers 11 and 12 as drawn, there will be a single or unique position of the slider combination thereon at which the slider potentials will be instantaneously both opposite and equal. This will place the slider 32 at ground or zero potential. If, however, either slider should be changed from its null position a voltage would appear at 32 having a phase relative to the reference phase at 24 representing the direction in which the slider was changed. The voltage appearing at slider 32 is termed an error voltage and can be employed to servo the slider assembly to its null position.

Resistors 28 and 29 are preferably made so high in resistance as not to load the voltage dividers appreciably, thus not destroying their linearity. However, it is also possible to employ lower resistance resistors and to compensate for their effects by changing the calibration of the output scale. These resistors are made of equal resistance and the slider 32 is set in the middle of voltage divider 31 when the scale constants of voltage dividers 11 and 12 are the same. However, if it is desired to compensate for different scale constants or other factors the resistors 28 and 29 can be made of different resistance, with additional compensation permitted by the use of voltage divider 31.

Several other methods of detection of the null position are available, with generation of an error signal when the slider assembly is not at its null position. For example, in place of the method described which may be termed the parallel adding or resistance adding method, a series adding method may be employed in which the center tap 23 is connected to slider 13 instead of to ground, with detection at slider 14. In another method restricted to alternating current or voltage data input a transformer primary winding can be connected between the sliders, with error voltage taken from the secondary winding.

The slider 32 is connected through a resistor 39 to the control grid 41 of the input stage 42 of an amplifier 43. The output of this tube is further amplified in a second tube 44 and in a third tube 46. A circuit 47 for advancing phase approximately 90° is connected between tubes 44 and 46. The tube 46 secures its plate supply through the primary winding 48 of an output transformer 49, the secondary winding 51 of which energizes one field 52 of a two-phase motor 53 having its other field 57 excited from the 400-cycle mains 24—24'. The motor is thus phase-sensitive, a phase reversal of the input secured from the tube 46 causing the motor rotation to reverse as occurring, for example, if the sliders 13 and 14 should be moved from one side of their null position to the other side. The motor 53 is connected through its shaft 58 and a reducing gear 59 to the slider insulating link 16, polarities and directions of rotation being so arranged that when the data $D_2$ are positive the sliders 13 and 14 are moved toward their null position. This is true for any position of the sliders, either in the upper parts or the lower parts of the voltage dividers. It also remains true when data $D_1$ becomes negative, reversing the relative phase of $E_1$. However, when the input data $D_2$ are negative, while input data $D_1$ remain positive, the relative phase of the input potential $E_2$ is reversed and the motor if not prevented would now fail to move the sliders 13 and 14 toward the null. There is therefore provided a phase-sensing relay 61 having reversing contacts interposed between the transformer secondary winding 51 and the motor field 52. This relay has a phasing winding 62 connected across the 400-cycle mains 24—24' and an operating winding 63 connected through an amplifier 60 across the input potential $E_2$. When $E_2$ has the phase representing positive $D_2$ data, the relay armatures 64 and 66 make contact with the back contacts 67 and 68, connecting the winding 51 to the field 52 in one sense, but when the potential $E_2$ has reversed phase representing negative $D_2$ data, the relay 61 is operated and the armatures 64 and 65 connect the field 52 through front contacts 69 and 71 reversing the direction of motor rotation to move the sliders 13 and 14 toward their null point in this case also. Thus the servomechanism moves the sliders toward their null position for all combinations of polarity of input data $D_1$ and $D_2$.

The shaft 58 of motor 53 is also connected through gear 54 to an output dial 56. This dial is calibrated from $-\infty$ to $+\infty$ as indicated in Fig. 2, both senses of infinity appearing as such on the dial. Thus all values of a fraction may be indicated, even when the denominator approaches and becomes zero.

The dial scale is computed in accordance with the following relations. In Fig. 1 let the length of the path of travel of slider 13 between midtap 17 and terminal 21 be represented by $\theta$, and let the distance of this slider from terminal 21 be represented by $\phi$. The distance of the slider 13 from the midtap 17 is then $\theta-\phi$. The potential of the slider 13 with respect to ground is $$\frac{\phi}{\theta}E_1$$

and the potential of the slider 14 with respect to ground is $$\frac{\theta-\phi}{\theta}E_2$$

These two potentials are equal at the null point, so that $$\frac{\phi}{\theta}E_1=\frac{\theta-\phi}{\theta}E_2 \qquad (4)$$

or $$\frac{E_1}{E_2}=\frac{\theta-\phi}{\phi} \qquad (5)$$

Combining with (3):

$$Y=C\frac{\theta-\phi}{\phi} \qquad (6)$$

This equation shows that when the respective sliders 13 and 14 are at the upper ends of the voltage dividers 11 and 12, $\phi$ is zero and the quotient Y becomes infinity. Conversely, when the sliders 13 and 14 are at the respective mid taps 17 and 23, $\phi$ equals $\theta$ and the quotient Y becomes zero. Since by assumption $D_1$ and $D_2$ are both positive, Y is positive throughout, and the scale representing the upper half of the slider range should therefore be positive and should vary from plus infinity, corresponding to the positions of sliders 13, 14 at the terminals 21 and 18, to zero corresponding to the positions of these sliders at the midtaps 17 and 23. The indicator 56 is provided with a scale 16*a* calibrated in accordance with this relation.

Let it now be considered that $D_1$ is negative, $D_2$ remaining positive. The phase of $E_1$ will consequently be opposite to its previous phase, and the null point will be on the lower halves of the voltage dividers 11 and 12, that is, between the respective mid taps 17 and 23 and the terminals 22 and 19. Applying Equation 6 a negative portion for scale 16a can be calibrated for use with the lower portions of the voltage dividers 11 and 12 with zero represented when the sliders 13 and 14 are at the mid taps and infinity when the sliders are at the terminal ends 22 and 19 of the voltage dividers 11 and 12. However, since the quantity $D_2$ is still positive but the quantity $D_1$ is negative, their quotient is negative and all values of the scale are negative. The second half of the scale for the indicator 56 is therefore similar to the first half reversed and of opposite sign. The increase in distance between graduations of the scale 16a toward zero, where it approaches linear proportions, is determined by the scale constant C. The scale is closely hyperbolic near $+\infty$ and $-\infty$, with the graduations relatively closely spaced at the non-critical large magnitudes, while near the quarter-scale points, the scale is approximately logarithmic.

If one of the input data be held constant, while the other is variable, the quotient will have a variation dependent upon a function of the variable input, the function being determined by Equation 6. This expansion of one portion of a scale and contraction of another portion is a distortion which is useful for many purposes.

Instability may present a problem in any servomechanism, and in the instant apparatus the computing potentiometers present an additional problem because the amount of error signal at unit distance from balance varies with the magnitudes of the separate input data voltages, producing a highly variable sensitivity. Accordingly, it is desirable to secure a stabilizing signal directly proportional to the average value of the input data voltage magnitudes at any instant, and to apply this signal to reduce the amplifier gain, so that the larger the input data the less the gain, resulting in constant servomechanism sensitivity at all input levels. To this end, a stabilizing network placed electrically between terminals 17 and 19 of the two input data voltages is provided. The ungrounded terminal 17, which is at $E_1$ potential above ground, is connected through a conductor 72 and resistor 73 to the anode 74 of a diode 76 having its cathode 77 grounded. The $E_2$ potential terminal 19 is connected through a conductor 78 and resistor 79 to the anode 81 of a second diode 82 having its cathode 83 grounded. Due to rectifying action, negative potentials appear at the anodes 74 and 81 proportional to $E_1$ and $E_2$ magnitudes, respectively, without regard to phase. The two anodes 74 and 81 are connected by two resistors 84 and 86, respectively, to a common junction point 87. A smoothing condenser 88 is connected between this junction point 87 and ground. The direct current potential of the junction 87 is therefore representative of the average of potentials $E_1$ and $E_2$. This direct current potential is applied through conductor 89 to a point 91 in the cathode resistances 92 and 93 of the second stage amplifier tube 44, thus modifying its direct-current grid bias in such a way as to maintain constant the sensitivity and hence stability of the entire servomechanism loop throughout wide changes in magnitudes of input data. It will be readily seen that the point 87 increases in negative potential as the potential difference between the sliders 13 and 14 increases. Accordingly, the negative bias on the control grid of the amplifier tube 44, by reason of the voltage drop through resistor 93, increases with increase in potential difference between the sliders 13 and 14, thereby reducing the amplification of the tube 44 and consequently reducing the sensitivity of the servomechanism.

The ratio of the relative values of the resistors 84 and 86, respectively are made proportional to the ratio of $C_1$ to $C_2$.

In Fig. 3 is illustrated a modified form of the invention in the form of a computer embodying the same basic principles of the previous embodiment but eliminating the necessity for a reversing relay. This embodiment also illustrates the employment of direct current input voltages and the use of thermistors for greatly improved stabilization.

A first computing voltage divider 94 is of the circular, continuous and endless type, having a single slider 96 that may be rotated in either direction indefinitely without encountering any stop, the resistive element being represented simply by the circle 94 for convenience in representation. The divider 94 has four tap points 97, 98, 99 and 101, spaced 90° apart. A second computing voltage divider 102 is similar. The divider 102 has a slider 103 and four equally spaced tap points 104, 106, 107 and 108. The voltage divider 94 is fed at the diametrically opposite tap points 97 and 99 from the positive and negative output terminals of a direct-current isolating amplifier 109 having an output direct-current potential of magnitude $E_{10}$. The tap points 98 and 101 are grounded. Likewise the voltage divider 102 is energized at the diametrically opposite tap points 106 and 108 from the output terminals of a direct current isolating amplifier 111 having an output potential of $E_{20}$, the points 104 and 107 being grounded. The sliders 96 and 103 are mechanically connected, indicated by the dashed line 112, so that they rotate in concert, maintaining the relative positions shown in Fig. 3.

Comparison of the voltage dividers of Fig. 3 with those of Fig. 1 shows that both embody the same principles because the left-hand portion of the voltage divider 94, considered alone, is a mid tapped resistor having its ends grounded and the mid tap energized. It thus is similar to the voltage divider 11, Fig. 1. The right-hand portion of the voltage divider 94, Fig. 3, is similar. Likewise, the left-hand portion of the voltage divider 102 is similar to the voltage divider 12, Fig. 1, as is also the right-hand portion.

The direct-current voltage inputs $E_{10}$ and $E_{20}$ may themselves constitute input data, or they may be analogous to input data of any type. One method of representation by them of mechanical displacement inputs is shown in Fig. 3. A mechanical displacement $D_{10}$ which is variable from a positive maximum to a negative maximum is indicated by the position of a slider 113 on a voltage divider 114 having a grounded mid tap 116 and terminals 117 and 118 energized from a direct current source 119 through mains 121. When the slider is at the top terminal 117 the mechanical input data $D_{10}$ is considered to be at its positive maximum and the potential of the slider 113 is at its electrically positive maximum. The amplifier 109, whose main function is that of isolation, supplies to the voltage divider 94 a potential $E_{10}$ whose polarity is defined as corresponding to positive data. When the input data $D_{10}$ is zero, $E_{10}$ is zero, and when $D_{10}$ is at its negative maximum, $E_{10}$ is at an electrical maximum with a polarity corresponding to negative data.

A voltage divider 122, similar to voltage divider 114, having a slider 123 actuated by mechanical data $D_{20}$ applies potential $E_{20}$ to the voltage divider 102. When the data $D_{20}$ is at its positive maximum the slider 123 is at the terminal 124 and the potential $E_{20}$ applied through isolating amplifier 111 has its corresponding maximum value of one polarity, while maximum negative data would be represented by the slider 123 being at terminal 126, making the potential $E_{20}$ a corresponding maximum value of opposite polarity.

In operation, the two sliders 96, 103 are moved around their respective voltage dividers 94, 102 in concert in either direction until that position is found at which there is zero potential between them. Inspection shows that for any magnitude and polarity of $E_{10}$ and $E_{20}$ there is one and only one such null point in the 360° rotational movement of the sliders 96 and 103. The null point is found automatically by the employment of a servomechanism utilizing the potential difference between the two sliders 96 and 103 as its energizing input voltage or error signal and having the rotation of a motor shaft of the motor M as its output. An indicator 157 having a scale upon which the quotient is indicated also is operated by the motor shaft.

The potential difference of the sliders 96 and 103 is applied through conductors 127 and 128 to the respective control electrodes 129 and 131 of two discharge tubes 132 and 133 connected as a direct current differential amplifier. The total current through the two tubes 132 and 133 is maintained constant by a tube 134 having a constant potential applied to its control grid 136 and having a fixed cathode resistance 137. Since all plate current in the tubes 132 and 133 must flow through the cathode resistor 137, the value thereof is so chosen as to maintain the proper bias as to maintain constant plate current thereby improving the differential operation of the amplifier.

The amplifier output is applied from the anodes 138 and 139 through electrodes 143 and 144 of a second differtial amplifier 155 comprising two tubes 146 and 147. The anodes 148 and 149 are connected to positive potential through two windings 151 and 152 constituting two separate fields of a direct-current motor 153. These field windings are connected in opposition, so that when the currents through them are equal the motor has no field excitation. However, when the amplifier 155 is differentially excited the two fields 151 and 152 are unequally energized and the motor 153 rotates, its direction of rotation depending upon the sense of the differential excitation. Through suitable shaft and gearing 154, 156 the motor 153 operates the sliders 96 and 103 in concert. The motor 153 also rotates the indicator 157 through suitable gearing 158.

In order to stabilize the servomechanism operation by providing constant sensitivity throughout the entire range of magnitudes of the input data, a thermistor unit 159 is employed having two heaters 161 and 162 and a thermistor element 163. The heater 161 is connected across the output terminals of the amplifier 109 so that its energization is directly proportional to the magnitude of $E_{10}$ and heater 162 is similarly connected to the output of amplifier 111 for energization by the potential $E_{20}$. The thermistor element 163 is connected across the output terminals of the phase-advancing networks 141 and 142 so that it constitutes the shunt element of an attenuating network in association with the resistors 164 and 166 of the networks 141 and 142. Consequently, increase of temperature of the thermistor element 163 caused by increased potential $E_{10}$ or $E_{20}$ or both, results in decrease of resistance of the thermistor element 163 and increased attenuation of the signal applied to the tubes 146 and 147.

In operation, considering that input data $D_{10}$ is divided in this computer by the input data $D_{20}$ to form a quotient $Y_1$, the null point is found in one or the other quadrants of the voltage dividers 94 and 102 in accordance with the positive and negative sense of each of the inputs $D_{10}$ and $D_{20}$, the four possible cases falling in the four quadrants. The consecutive output ranges corresponding to movement of the null through the four quadrants consecutively are $-\infty$ to 0, 0 to $+\infty$, $-\infty$ to 0, and 0 to $+\infty$, as shown in Fig. 4. Thus the indicator 157, if it operates in concert with the sliders 96 and 103, has two similar 180° halves, each having a scale ranging from minus infinity to plus infinity constructed in accordance with the use of Equation (6) and the principles described in connection with Fig. 1. Obviously, however, if the gearing 158 be designed to operate the indicator 157 one revolution for each half revolution of the sliders 96 and 103, a dial scale similar to Fig. 2 except with a full 360° of the circle as shown in Fig. 5, may be employed. Such a 360° dial is of course, superior to a 180° dial, being twice as large in extent.

What is claimed is:

1. A computer for dividing a first electrical quantity having a range including positive and negative senses and representative of first input data by a second electrical quantity having a range including positive and negative senses and representative of second input data to form output data comprising, a first impedor having electrically common terminals and an intermediate fixed tap between which said first electrical quantity is supplied, a second impedor having a pair of terminals to which said second electrical quantity is supplied and an intermediate fixed tap electrically common with the terminals of said first impedor, two adjustable taps, one on each of said impedors, balancing means, circuit means for impressing an electrical "error signal" representative of the electrical difference of said two adjustable taps upon said balancing means, control means operated by said balancing means for simultaneously varying the positions of said two adjustable taps on said two impedors in opposite electrical directions to tend to nullify said "error signal," means for detecting the senses of said first and second input data and for exercising joint control of the direction of operation of said control means in accordance with said detected senses, and an indicator of output data operated by said control means.

2. A computer for dividing a first electrical voltage having a range including opposite senses by a second electrical voltage having a range including opposite senses to form output data comprising, a first voltage divider having electrically common terminals and an intermediate fixed tap between which said first electrical voltage is impressed, a second voltage divider having terminals upon which said second electrical voltage is impressed, and an intermediate fixed tap electrically common with said terminals of said first voltage divider, two sliders adjustably positioned one on each of said voltage dividers, balancing means, circuit means for impressing an electrical "error signal" representative of the difference of the electrical potentials of said two sliders upon said balancing means, stabilizing circuit means connected to said first and second voltage dividers for actuation by the average magnitude of the arithmetical sum of said first and second electrical voltages and having an output connection to said balancing means for control of the gain thereof according to an inverse function of said average magnitude, means operated by said balancing means for adjusting said two sliders in concert to tend to nullify said "error signal," and an indicator of output data operated by said last-named means.

3. A computer for dividing a first alternating voltage having any phase relative to a standard by a second alternating voltage having a known phase relative to said standard to form output data comprising, a first impedor having electrically common terminals and an intermediate fixed tap between which said first voltage is impressed, a second impedor having terminals upon which said second voltage is impressed, and an intermediate fixed tap electrically common with said terminals of said first impedor, two adjustable taps one on each of said impedors, balancing means, circuit means for impressing an electrical "error signal" representative of the voltage difference and phase difference of said two adjustable taps upon said balancing means, means for detecting the phases of said first and second alternating voltages, means jointly operated by said balancing means and by said detecting means for adjusting said two adjustable taps in opposite electrical directions to tend to nullify said error signal, and an indicator of output data operated by said last-named tap-adjusting means.

4. A computer for dividing a first direct-current voltage having a range including positive and negative senses by a second direct-current voltage having a range including positive and negative senses to form output data comprising, a first resistor having electrically common terminals and an intermediate fixed terminal between which said first direct current voltage is impressed, a second resistor having terminals between which said second direct current voltage is impressed and an intermediate fixed tap electrically common with said terminals of said first resistor, two sliders adjustably positioned one on each of said resistors, balancing means, circuit means for impressing an electrical "error signal" representative of the algebraic difference of the potential of said two sliders upon said balancing means, means for detecting the senses of said first and second voltages, means jointly operated by said balancing means and by said detecting means for adjusting said two sliders in opposite electrical directions in concert to tend to nullify said "error signal," and an indicator of output data operated by said last-named means.

5. A computer for dividing a first electrical voltage having a range including opposite senses by a second electrical voltage having a range including opposite senses to form output data comprising, a first voltage divider having two electrically common terminals and a mid tap between which said first electrical voltage is impressed, a second voltage divider having two terminals between which said second electrical voltage is impressed, said second voltage divider having a mid tap between said latter two terminals, a connection between said last-named mid tap and the two interconnected terminals of said first voltage divider, two sliders adjustably positioned one each of said voltage dividers, balancing means, circuit means for impressing an electrical "error signal" representative of the difference in the electrical state of said two sliders upon said balancing means, means for detecting the senses of said first and second voltages, means jointly operated by said balancing means and said detecting means for adjusting said two sliders in concert in opposite electrical directions to tend to nullify said "error signal," and an indicator of output data operated by said last-named adjusting means.

6. A computer for dividing a first electrical voltage having a range including opposite senses by a second electrical voltage having a range including opposite senses to form output data comprising, a first voltage divider comprising a circular endless resistor having first, second, third and fourth fixed taps equally spaced, said first and third taps being interconnected, said first voltage divider having a slider continuously movable in both directions, a second voltage divider comprising a circular endless resistor having first, second, third and fourth fixed taps equally spaced, said second and fourth taps being interconnected said second voltage divider also having a slider continuously movable in both directions, a mechanical connection between said two sliders constraining them for rotation in concert so that they pass said two first taps simultaneously and said two second taps simultaneously, electrical connections for applying said first electrical voltage between the second and fourth taps of said first voltage divider, electrical connections for applying said second electrical voltage between the first and third taps of said second voltage divider, balancing means, circuit means for supplying to said balancing means an "error signal" representative of the differences of electrical potential and sense of said two sliders, means for detecting the senses of at least one of said first and second voltages, means jointly operated by said balancing means and said detecting means for adjusting said two sliders in concert in opposite electrical directions to tend to nullify said "error signal," and an indicator of output data operated by said last-named adjusting means.

7. A computer for dividing a first electrical voltage having a range including positive and negative senses by a second electrical voltage having a range including positive and negative senses to form output data comprising, a first impedor having electrically common terminals and an intermediate fixed tap between which said first electrical voltage is impressed, a second impedor having terminals upon which said second electrical voltage is impressed and an intermediate fixed tap electrically common with said terminals of said first impedor, two adjustable taps, one on each of said impedors, balancing means, circuit means for impressing an electrical "error signal" representative of the difference in the electrical states of said two adjustable taps upon said balancing means, impedance means bridged between said first and second impedors for securing a voltage representative of the arithmetical average of said first and second electrical voltages and having an output connected to said balancing means for applying said average voltage to control the gain of said balancing means as an inverse function thereof, means operated by said balancing means for adjusting said two adjustable taps to tend to nullify said "error signal," and an indicator of output data operated by said last-named means.

8. A computer for dividing a first electrical voltage having a range including positive and negative senses by a second electrical voltage having a range including positive and negative senses to form output data comprising, a first impedor having electrically common terminals and an intermediate fixed tap between which said first electrical voltage is impressed, a second impedor having terminals upon which said second electrical voltage is impressed and an intermediate fixed tap electrically common with said terminals of said first impedor, two adjustable taps, one on each of said impedors, balancing means, circuit means for impressing an electrical "error signal" representative of the difference in the electrical states of said two adjustable taps upon said balancing means, thermistor means connected to said first and second impedors for energization by the arithmetical average of said first and second electrical voltages and connected to said balancing means for controlling the output energy thereof as an inverse function of said arithmetical average voltage, means operated by said balancing means for adjusting said two adjustable taps to tend to nullify said "error signal," and an indicator of output data operated by said last-named means.

9. A computer for dividing a first electrical voltage having a range including positive and negative senses by a second electrical voltage having a range including positive and negative senses to form output data comprising, a first impedor having electrically common terminals and an intermediate fixed tap between which said first electrical voltage is impressed, a second impedor having terminals upon which said second electrical voltage is impressed and an intermediate fixed tap electrically common with said terminals of said first impedor, two adjustable taps, one on each of said impedors, balancing means, a third impedor connected between said two adjustable taps, an electrical connection from an intermediate point of said third impedor to an input terminal of said balancing means whereby it is energized in accordance with the magnitude of the arithmetical average of the electrical voltages of said two adjustable taps, a shaft connection from said balancing means to said two adjustable taps to adjust them in such direction and amount as to tend to nullify said arithmetical average of electrical voltages thereof, and an indicator of output data operated by said shaft connection.

10. A computer for dividing a first electrical voltage having a range including positive and negative senses by a second electrical voltage having a range including positive and negative senses to form output data comprising, a first impedor having electrically common terminals and an intermediate fixed tap between which said first electrical voltage is impressed, a second impedor having terminals upon which said second electrical voltage is impressed and an intermediate fixed tap electrically common with said terminals of said first impedor, two adjustable taps, one on each of said impedors, a differential amplifier actuated by the differences in the magnitudes and senses of the voltages of said two adjustable taps, a motor actuated by said differential amplifier in accordance with said differences, a shaft connection from said motor to said two adjustable taps to adjust them in such direction and amount as to tend to nullify said differences, and an indicator of output data operated by said shaft connection.

11. A computer for dividing a first electrical voltage having a range including opposite senses by a second electrical voltage having a range including opposite senses to form output data comprising, a first voltage divider having two interconnected terminals and a midtap between which said first electrical voltage is impressed, a second voltage divider having terminals upon which said second voltage is impressed and a mid tap electrically common with said terminals of said first voltage divider, a connection between said last-named midtap and the two interconnected terminals of said first voltage divider, two sliders positioned one on each of said voltage dividers, balancing means, circuit means for impressing an electrical "error signal" representative of the difference in the electrical state of said two sliders upon said balancing means, a sense-sensitive relay connected to said second voltage divider for operation in accordance with the sense of said second electrical voltage, means jointly operated by said balancing means and said sense-sensitive relay for adjusting said two sliders in concert in opposite electrical directions to tend to nullify said "error signal," and an indicator of output data operated by said last-named adjusting means.

12. A computer for dividing a first electrical quantity having a range including positive and negative senses by a second electrical quantity having a range including positive and negative senses to form output data comprising, a first linear impedor having two electrically common terminals and an intermediate fixed tap between which said first electrical quantity is supplied, a second linear impedor having terminals to which said second electrical quantity is supplied and an intermediate fixed tap which is electrically common with said terminals of said first impedor, two adjustable taps, one on each of said impedors, balancing means, circuit means for impressing an electrical "error signal" representative of the difference in the electrical state of said two adjustable taps upon said balancing means, means operated by said balancing means for adjusting said two adjustable taps to tend to nullify said "error signal," and a visual dial for indicating output data on a scale borne thereby operated by said last-named means, said scale having at least two equal portions, one being the reverse of the other and of different sign, each portion being constructed in accordance with the equation $$Y = C\frac{\theta - \phi}{\phi}$$

in which Y is a scale quantity, C is a scale constant, $\theta$ is the measure of the full range of movement of said two adjustable taps between any two adjacent impedor fixed connection points, and $\phi$ is the measure of displacement at the null position of said two adjustable taps from one fixed connection point.

References Cited in the file of this patent

UNITED STATES PATENTS

| | | |
|---|---|---|
| 2,617,586 | Gray | Nov. 11, 1952 |
| 2,686,099 | Bomberger et al. | Aug. 10, 1954 |